United States Patent [19]

Schoolman

[11] 4,408,844
[45] Oct. 11, 1983

[54] EYEGLASS FRAME WITH STRUCTURAL SPARE KEY

[76] Inventor: Arnold Schoolman, 400 Rockhill Medical Bldg., 6700 Troost Ave., Kansas City, Mo. 66131

[21] Appl. No.: 288,470

[22] Filed: Jul. 30, 1981

[51] Int. Cl.³ .............................................. G02B 1/24
[52] U.S. Cl. ................................. 351/158; 70/456 R; 351/111; 351/119
[58] Field of Search ...................... 351/105, 111–123; 70/393, 456 R, 458

[56] References Cited

U.S. PATENT DOCUMENTS

| | | |
|---|---|---|
| 2,094,236 | 9/1937 | Hempel ............................... 351/111 |
| 3,016,796 | 1/1962 | Boothe . |
| 3,156,757 | 11/1964 | Spina .................................... 351/123 |
| 3,209,755 | 10/1965 | McCarthy et al. . |
| 3,266,111 | 8/1966 | Abel . |
| 3,390,938 | 7/1968 | Gansz . |
| 3,416,858 | 12/1968 | Bowes ................................... 351/118 |
| 3,663,099 | 5/1972 | Soffer . |

*Primary Examiner*—John K. Corbin
*Assistant Examiner*—Paul M. Dzierzynski
*Attorney, Agent, or Firm*—Litman, Day & McMahon

[57] ABSTRACT

An eyeglass frame with structural spare key is provided comprising an eyeglass frame having a lens supporting member with opposed, spaced temple bars extending rearwardly from sides thereof with at least one of the temple bars having integrally incorporated therewith at a free end thereof a key to be used by the wearer of the eyeglass frame as a spare key for emergencies.

10 Claims, 4 Drawing Figures

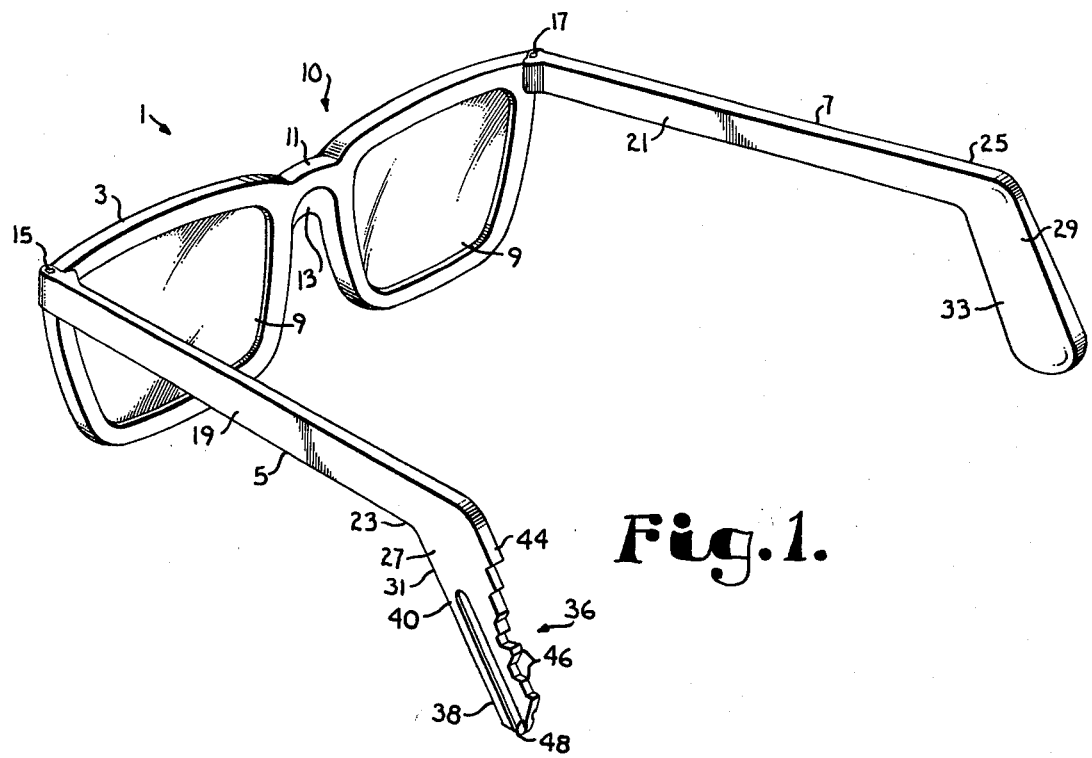

4,408,844

EYEGLASS FRAME WITH STRUCTURAL SPARE KEY

BACKGROUND OF THE INVENTION

This invention relates to eyeglass frames and in particular to an eyeglass frame wherein one of the structural members thereof which is used to support the eyeglasses on the head of the user has integrally incorporated therewith a key.

It is known that individuals, from time to time, will absent-mindedly or otherwise lock an enclosure such as a car or a house with the key to the enclosure remaining thereinside. When this occurs, unless the user has a spare key to the enclosure outside thereof, it is necessary to either have a locksmith open the lock or break into the enclosure, both of which alternatives require an expense of time, effort and money.

Further, at certain times, such as when swimming or the like, it is inconvenient for an individual to carry with him a bulky set of keys although the individual would conveniently wear a pair of glasses, either prescription glasses or sunglasses.

SUMMARY OF THE INVENTION

An eyeglass frame with structural spare key is provided which comprises an eyeglass frame having a lens supporting member which is to be supported on a nose of a user, lenses retained in the support member in optical alignment with eyes of the user, and temple bars extending rearwardly from the support member at both sides thereof with the temple bars being supported on ears of the user. At a free end of at least one of the temple bars is integrally formed therewith a key member such as for a house, automobile or the like.

That portion of the temple bar comprising the key member can be adapted to be removably attached to the remaining portion of the temple bar. A plurality of key members can then be selectively affixed to the eyeglass frame depending on the desires of the user.

In another embodiment, the key member could be hingedly connected to the eyeglass frame to allow for easy manipulation of an associated lock mechanism by the user.

The eyeglass frame with structural spare key will allow a user thereof to constantly have with him, when he is wearing such an eyeglass frame, a spare key to a desired object such as his house, automobile or the like.

OBJECTS OF THE INVENTION

Therefore, the objects of the present invention are: to provide an eyeglass frame that has a key member integrally provided with a structural component thereof; to further provide such an eyeglass frame having a lens support member retaining lenses therein and temple bars extending rearwardly therefrom with at least one of the temple bars terminating in a key member; to provide such an eyeglass frame wherein said key member comprises an earpiece of the associated temple bar; to provide such an eyeglass frame wherein the earpiece is selectively removable from the remaining temple bar; to provide with such an eyeglass frame a plurality of ear pieces, each selectively mateable with the remaining temple bar; to further provide such an eyeglass frame wherein that portion of the temple bar which comprises a key is pivotally attached with respect to the remaining temple bar; and to further provide such an eyeglass frame which is easy to manufacture, durable in use, and particularly well adapted for the intended usage thereof.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an eyeglass frame having a structural spare key according to the present invention.

FIG. 2 is a fragmentary, enlarged, side elevational view of a portion of a temple bar of the eyeglass frame.

FIG. 3 is a fragmentary side elevational view of a portion of a temple bar of a second embodiment of the present invention.

FIG. 4 is a fragmentary perspective view of a temple bar of a third embodiment of the present invention.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an eyeglass frame according to the present invention. As shown in FIG. 1, the eyeglass frame 1 includes a lens support member 3 traversely retained between two temple bars 5 and 7 which extend rearwardly from sides of the lens support member 3.

The lens support member 3 supports a pair of suitable lenses 9 which are operably retained in optical alignment with eyes of a user. The lenses 9 can be of suitable construction such as to be optically correctable or light inhibitory as in sunglasses. The lens support member 3 further includes near a central portion 10 thereof, a bridge 11 positioned between the two lenses 9 which bridge 11 includes a lower surface 13 thereof which is engageable with a nose of a user.

The temple bars 5 and 7 are connected to the lens support member 3 by means of hinges 15 and 17 which allow the respective temple bars 5 and 7 to be foldable relative to the lens support member 3 to allow easy storage of the eyeglass frame 1 in a suitable container such as an eyeglass case (not shown).

As shown in FIG. 1, the temple bars 5 and 7 each respectively include a generally elongate portion 19 and 21 and, at distal ends 23 and 25 thereof, ear pieces 27 and 29 respectively which are adapted to engage and be supported by ears (not shown) of a user as with conventional eyeglass frames. As shown herein, the earpieces 27 and 29 include a downwardly turned portion 31 and 33. It is understood that the temple bar distal ends 23 and 25 could be of any desired shape to engage and be supported by the ears of a user. Further, it is seen that the eyeglass frame 1 is supported on the head of a user by means of bridge 11, which engages a nose of the user and earpieces 27 and 29 which engages ears of the user.

As best shown in FIG. 2, at least one of the earpieces 27 and 29, shown herein as earpiece 27, further comprises a key member 36. The key member 36 includes a blade portion 38 having side surfaces 40 and oposed edges 42 and 44. Edge 44 includes thereon a series of ridges 46 and surface 40 includes a groove 48 therein both of which are mateable with tumbler pins of a lock (not shown) when the key member blade 38 is inserted thereinto. The pattern of ridges 46 and grooves 48 is such that the key member 36 is mateable with a desired lock such as a house lock or an ignition or door lock of an automobile. Since it is anticipated that the key member 36 will only be used sparingly as when a user of the eyelass frame 1 inadvertently misplaces a conventional key (not shown) to the lock to which the key member 36 is mateable, the key member 36 need not be fabricated of a high strength material such as metal, but could be fabricated of a suitable material such as hard plastic which will allow intermittent and non-continual use of the key member 36 yet would be light in weight and less expensive.

It is noted that preferably, the key member ridges 46 face upwardly relative to an ear of a user so as to not engage the ear when placed thereover. This is to avoid irritation or injury to the ear. Also, a suitable covering (not shown) could be fitted over the key member 36 when not in use to further prevent irritation to a user by contact with the ridges 46 and to also provide a more aesthetically pleasing appearance.

In use, a user of the eyeglass frame 1 would support the eyeglass frame on his head by placing the earpieces 27 and 29 over his ears and supporting the lens support member 3 on his nose by placing the bridge lower surface 13 in engagement therewith. As such, the eyeglass frame 12 is supported on the head of the user with the points of support being the bridge lower surface 13 and the temple bar earpieces 27 and 29.

When a user of the eyeglass frame 1 has found himself in a position wherein he desires to open a lock which is openable by key member 36 but he has misplaced, or otherwise does not have with him at that time, the conventional key mateable with the lock, the user could remove his eyeglass frame 1 and insert the key member 36 into the lock and open same therby. After opening the lock the user could then replace the eyeglass frame 1 onto his head.

A second embodiment of an eyeglass frame with structural spare key according to the present invention is shown in FIG. 3 and is generally designated by the reference numeral 58. The eyeglass frame 58 comprises a lens support member, including lenses, similar to lens support member 3 and lenses 9 of the first embodiment of the present invention as shown in FIG. 1. The eyeglass frame 58 further includes temple bars 60 hingedly connected to the lens support members as temple bars 5 and 7 are connected to lens support member 3. Associated with one of the temple bars 60 and connected thereto at a distal end 61 thereof is an earpiece 62. Earpiece 62 is similar to earpiece 27 and includes a downwardly turned portion 64 which fits over an ear of a user thereof. As shown in FIG. 3, the earpiece 62 is selectively detachable from the temple bar 60.

The earpiece 62 includes at a first end 66 thereof, a series of teeth 68 extending downwardly from a top portion 70 thereof. Between the earpiece teeth 68 are valleys 71. The temple bar distal end 61 also includes teeth 75, which are received within the earpiece valleys 71 and valleys 73 in which are received the earpiece teeth 68. The dimensions of the respective teeth and valleys is such that when the temple bar 60 and earpiece 62 are mated as shown in FIG. 3, the interengaged temple bar and earpiece display continuous upper and lower surfaces.

A substantially non-flexible sleeve 80 is provided on temple bar 60 which snugly engages the temple bar 60 and which is movable to a position as shown in FIG. 3 wherein the sleeve 80 fits over the interengaged temple bar distal end 61 and the earpiece first end 66. In this position, the sleeve 80 prevents the earpiece 62 from moving in a transverse direction either upwardly or sideways relative to temple bar 60. Further, the interengaged teeth and valleys prevent the earpiece 62 from moving longitudinally with temple bar 60 thereby securing the earpiece 62 to the temple bar 60.

The earpiece 62 further includes in the downwardly turned portion 64 thereof a key member 83 including a series of ridge 86 and grooves 88 which are mateable with tumbler pins of a lock (not shown).

In use, a user of the eyeglass frame 58 is able to remove that portion of the temple bar 60 which comprises the key member 83. To do this, the user would slide the sleeve 80 away from the point of connection between the temple bar 60 and earpiece 62 allowing the earpiece 62 to be removed therefrom. As such, the key member 83 is removable from the eyeglass frame 58 and is more easily manipulated within a lock.

Since the earpiece 62 is detachable relative to the eyeglass 58, a user of the eyeglass frame 58 could replace the earpiece 62 with another earpiece (not shown) having matching teeth and valleys but having ridges and grooves thereon capable of unlocking a different lock than key member 83. A user of such an eyeglass frame could also be provided with a set of such earpieces 62, each mateable with a different lock. The user could then selectively interchange the earpieces ensuring that a desired earpiece 62 is always attached to the associated eyeglass frame 58. Further, a user of the eyeglass frame 58 could be provided with an earpiece 62 which had no key member formed thereon, as earpiece 29 of eyeglass frame 1.

A third embodiment of the eyeglass frame structure according to the present invention is shown in FIG. 4 and generally designated by the reference numeral 94. The eyeglass frame structure 94 would include a lens support member (not shown) as set forth in the previous embodiments. Further, the eyeglass frame structure would include temple bars 96 foldably attached to the lens support member. At least one of the temple bars 96 would have affixed thereto at a distal end 98 thereof an earpiece 100. As shown in FIG. 4, the earpiece 100 is pivotal about a hinge 102 relative to the temple bar 96. The hinge 102 further includes a sleeve 104 which securely engages the temple bar 96 and which, when the sleeve is biased to position covering the hinge 102, prevents the earpiece 100 from pivoting relative to the temple bar 96.

The earpiece 100 includes thereon a key member 108 having a plurality of ridges 110 and grooves 112 therein and is mateable with a suitable lock (not shown).

In use, a user of the eyeglass frame structure 94 would support the eyeglass frame structure on his head in the same manner as the eyeglass structure 1 shown in FIGS. 1 and 2. Since the key member 108 is pivotable relative to the temple bar 96, the user of the eyeglass structure 94 could use the key member 108 to unlock a lock which is not easily accessible as in the case with automobile ignition locks. Further, the user of the eyeglass frame structure 94 would continually have the key member 108 attached to the associated temple bar 96.

It is to be understood that while certain embodiments of the present invention have been illustrated and described herein, it is not to be limited to the specific forms or arrangement of parts described and shown.

What is claimed and desired to secure by Letters Patent is:

1. An eyeglass frame structure comprising:
   (a) a lens support member including a portion thereof engageable with and partially supported by a nose of a user of said eyeglass frame structure;
   (b) a pair of lenses retained within said lens support member, each lens placed in optical alignment with an eye of said user;
   (c) at least one temple bar extending from and connected to a side of said lens support member, said temple bar including on a distal end thereof an earpiece engageable with an ear of a user thereof, said eyeglass frame structure being partially supported by said earpiece, and wherein:
   (d) said earpiece, being in the form of a key member; said key member includes thereon suitable ridges and grooves mateable with tumbler pins of an associated lock so as to allow said key member to be utilized to unlock such a lock.

2. The structure as set forth in claim 1 wherein:
   (a) said earpiece extends downwardly from said temple bar.

3. The structure as set forth in claim 1 wherein:
   (a) said earpiece is pivotally connected to said temple bar at a hinge positioned therebetween.

4. The structure as set forth in claim 3 including:
   (a) a substantially rigid sleeve retained over said temple bar selectively positionable over said temple bar hinge whereby said earpiece is prevented from pivoting relative to said temple bar.

5. An eyeglass frame structure comprising:
   (a) a lens support member including a portion thereof engageable with and partially supported by a nose of a user of said eyeglass frame structure;
   (b) a pair of lenses retained within said lens support member, each lens placed in optical alignment with an eye of said user;
   (c) at least one temple bar extending from and connected to a side of said lens support member, said temple bar including on a distal end thereof an earpiece engageable with an ear of a user thereof, said eyeglass frame structure being partially supported by said earpiece, wherein:
   (d) said earpiece being in the form of a key member; said key member having thereon ridges and grooves adapted to be mateable with tumbler pins of an associated lock so as to allow opening of such lock; and
   (e) said earpiece is selectively removable from said associated temple bar distal end.

6. The structure as set forth in claim 5 wherein:
   (a) said earpiece and said temple bar include at said temple bar distal end and at an earpiece first end respective interengaging ridges and valleys extending transverse to said temple bar, said ridges and valleys prohibiting said earpiece from longitudinal movement relative to said temple bar distal end.

7. The structure set forth in claim 6 including:
   (a) a sleeve engagingly surrounding said temple bar and selectively positioned over said temple bar distal end and earpiece first end prohibiting any transverse movement of said earpiece relative to said temple bar.

8. An eyeglass frame structure comprising:
   (a) a lens support member including a portion thereof engageable with and partially supported by a nose of a user of said eyeglass frame structure;
   (b) a pair of lenses retained within said lens support member, each lens placed in optical alignment with an eye of said user;
   (c) a pair of temple bars extending from and connected to respective sides of said lens support member, each of said temple bars including a distal end thereon;
   (d) a set of earpieces; one of said earpieces respectively being associated with each of said temple bar distal ends and when retained thereon engageable with an ear of a user thereof, said eyeglass frame structure being partially supported by said earpiece; and
   (e) at least one of said earpieces including a key member; said key member having ridges and grooves associated therewith adapted to mate with an associated lock so as to allow such lock to be unlocked; said key member being included in said respective earpiece so as to form a single unit therewith.

9. The structure as set forth in claim 8 wherein:
   (a) said earpieces of said set each include thereon a key member.

10. The structure as set forth in claim 8 wherein:
    (a) said earpiece associated with said key member is selectively removable from the temple bar associated therewith.

* * * * *